(12) United States Patent
Horwitz et al.

(10) Patent No.: US 6,545,826 B2
(45) Date of Patent: Apr. 8, 2003

(54) THERMALLY COMPENSATED WAVELENGTH DIVISION DEMULTIPLEXER AND MULTIPLEXER AND METHOD OF FABRICATION THEREOF

(75) Inventors: James W. Horwitz, Santa Barbara, CA (US); Jie Qiao, Austin, TX (US); Feng Zhao, Austin, TX (US); Kwei Kwang Chang, Austin, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/742,994

(22) Filed: Dec. 20, 2000

(65) Prior Publication Data

US 2002/0109926 A1 Aug. 15, 2002

(51) Int. Cl.[7] .............................. G02B 7/02; G02B 6/34
(52) U.S. Cl. .......................................... 359/820; 385/37
(58) Field of Search ................................ 359/820, 115, 359/124, 127, 558, 560, 566; 385/33, 37, 35, 38, 49

(56) References Cited

U.S. PATENT DOCUMENTS

| | | | | |
|---|---|---|---|---|
| 5,260,828 A | | 11/1993 | Londono et al. | ............ 359/565 |
| 5,691,847 A | | 11/1997 | Chen | ........................ 359/565 |
| 5,737,120 A | | 4/1998 | Arriola | ....................... 359/356 |
| 5,745,289 A | | 4/1998 | Hamblen | .................... 359/565 |
| 5,799,118 A | * | 8/1998 | Ogusu et al. | ................. 385/14 |
| 5,917,625 A | * | 6/1999 | Ogusu et al. | ............... 359/130 |
| 6,067,392 A | | 5/2000 | Wakami et al. | ............... 385/37 |
| 6,134,039 A | * | 10/2000 | Rudeen | ....................... 359/196 |
| 6,134,359 A | * | 10/2000 | Keyworth et al. | ............. 385/33 |
| 6,169,838 B1 | * | 1/2001 | He et al. | ..................... 385/129 |
| 6,239,891 B1 | * | 5/2001 | Nakama | ...................... 359/131 |
| 6,275,630 B1 | * | 8/2001 | Yang et al. | .................. 385/137 |
| 6,282,337 B1 | * | 8/2001 | Horwitz et al. | ................ 385/24 |
| 6,304,586 B1 | * | 10/2001 | Pease et al. | ............. 372/38.02 |
| 6,307,657 B1 | * | 10/2001 | Ford | ........................... 359/130 |
| 6,360,041 B1 | * | 3/2002 | Nakama et al. | ............... 385/37 |
| 6,381,387 B1 | * | 4/2002 | Wendland, Jr. | |
| 6,415,080 B1 | * | 7/2002 | Sappey et al. | |

OTHER PUBLICATIONS

Horwitz, J. W., "Ebert spectrometers free of astigmatism and coma," Optica Acta [now J. of Modern Optics] 21, 1974, pp. 169–190.

J. F. James and R. S. Sternberg, *The design of optical spectrometers* (Chapman and Hall, London, 1969), pp. 48–49, 68–69, 72–79, and 218–221.

* cited by examiner

Primary Examiner—Georgia Epps
Assistant Examiner—Saeed Seyrafi
(74) Attorney, Agent, or Firm—Gray Cary Ware & Freidenrich LLP

(57) ABSTRACT

Thermally compensated wavelength division demultiplexers and multiplexers are disclosed. In one aspect, thermally compensated optical systems for use in an optical network are disclosed. The systems include a diffraction grating coupled to a grating mount having a temperature coefficient. The systems further include an optical fiber coupled to a fiber mount having a temperature coefficient and a lens assembly coupled to a lens mount. The lens mount is operable to position the lens assembly between the fiber mount and the grating mount and includes a substantially similar temperature coefficient to the fiber mount.

40 Claims, 2 Drawing Sheets

THERMALLY COMPENSATED WAVELENGTH DIVISION DEMULTIPLEXER AND MULTIPLEXER AND METHOD OF FABRICATION THEREOF

GOVERNMENTAL RIGHTS

The invention was made with Government support under Contract No. DASG60-98-C-0062 and DASG60-98-C-0108 awarded by U.S. Army Space & Missile Defense Command Contracts, SMDC-CM-CK. The Government has certain rights in the invention.

TECHNICAL FIELD OF THE INVENTION

The present invention generally relates to thermally compensated optical systems, and more particularly, to thermally compensated wavelength division demultiplexers and multiplexers and method of fabrication thereof.

BACKGROUND OF THE INVENTION

The increasing demand for high-speed broadband communications has resulted in a rapid increase in fiber optic communications systems which require faster and more reliable components to interconnect associated optoelectronic devices of a network. These components may include devices for steering light beams through light transmissive mediums at specific angles. Currently, devices use opto-mechanical or electro-optical technology to steer light beams to a specified angle.

Problems which may occur in optical components include performance degradation due to variances in temperature. Optical components may be used in several different environments which may require components or systems that are intolerant to changes in temperature. In wavelength-division multiplexers and demultiplexers, characteristics that may alter as the temperature changes include channel bandpass, channel central wavelengths, polarization-dependent loss (PDL), and channel insertion losses.

Lens materials possess both a coefficient of thermal expansion and a temperature derivative of refractive index. Thus one cannot merely use zero-expansion lens materials unless these materials also have refractive indices that are invariant with temperature. Mirror systems, on the other hand, do have optical properties that are independent of temperature, provided the mirrors and the support structure are all made with zero-expansion glass.

Some systems use a coaxial two-mirror all-reflecting lens. However, there is a transmission loss caused by the central obscuration. Another possibility is the use of off-axis mirrors, as is commonly done in the well-known Czerny-Turner and Ebert spectrometers. These mirror configurations may increase the size of the device over that of a coaxial system, and have not been seriously considered for use.

SUMMARY OF THE INVENTION

In accordance with teachings of the present invention, a thermally compensated optical device is provided. The optical device includes a diffraction grating having a substantially zero temperature coefficient and a grating mount having a temperature coefficient coupled to the diffraction grating. The device further includes a lens assembly coupled to a lens mount having a temperature coefficient and operable to communicate optical signals between the lens assembly and the diffraction grating. The lens assembly includes a lens element having a thermal derivative of refractive index based on the temperature coefficient of the lens mount.

In accordance with another aspect of the present invention, a thermally compensated optical system is provided. The system includes a lens mount having a temperature coefficient and operable to position a lens assembly within an optical path. The system further includes a fiber mount operable to position an optical fiber at a thermally compensated distance relative to the lens assembly. The optical fiber mount includes a substantially similar temperature coefficient as the lens mount and the fiber mount is positioned relative to the optical lens mount such that a focal plane of the lens assembly is maintained at the optical fibers in response to a temperature variation.

In accordance with another aspect of the present invention, a thermally compensated optical system is provided. The system includes a diffraction grating coupled to a grating mount having a temperature coefficient. The system further includes an optical fiber coupled to a fiber mount and the fiber mount having a fiber mount temperature coefficient. The system further includes a lens assembly coupled to a lens mount. The lens mount was a substantially similar temperature coefficient to the fiber mount, and the lens assembly is positioned between the fiber mount and the grating mount.

In accordance with another aspect of the present invention an optical network for communicating information embodied within an optical signal is provided. The network includes a thermally compensated optical device operable to communicate information between an initiating point and a destination point. The device includes a lens mount operable to position a lens assembly within an optical path and the lens mount includes a temperature coefficient. The device further includes a fiber mount operable to position an optical fiber at a thermally compensated distance relative to the lens assembly and the optical fiber mount includes a substantially similar temperature coefficient as the lens mount. The fiber mount is positioned relative to the optical lens mount such that a focal plane associated with the optical fiber mount is maintained in response to a temperature variation.

In accordance with another aspect of the present invention a method of fabricating a thermally compensated optical device is disclosed. The method includes coupling a diffraction grating to a grating mount and the diffraction grating includes a substantially zero temperature coefficient. The method includes coupling a fiber mount plate to a fiber mount wherein the fiber mount plate includes a fiber mount temperature coefficient. The method also includes positioning a lens assembly between the grating mount and the fiber mount such that the lens assembly communicates optical signals between the lens assembly and the diffraction grating. The method further includes coupling a lens element to the lens assembly, the lens element including an expansion coefficient, a refractive index and thermal derivatives of index based on the temperature coefficient of the base plate.

It is a technical advantage of the present invention to provide a thermally compensated WDDM module having a wide thermal operating range.

It is a further technical advantage of the present invention to provide a demultiplexer having insertion loss that is substantially invariant to changes in temperature.

It is another technical advantage of the present invention to provide a WDDM module having thermally matched optical elements and mounting fixtures.

It is another technical advantage of the present invention to provide a thermally compensated WDDM module that uses a zero-expansion optical grating.

It is another technical advantage of the present invention to provide a fiber optic mount and lens mount having substantially similar temperature coefficients such that the fiber mount and lens mount are coaxial with each other as the temperature varies.

It is a further technical advantage of the present invention to provide a refractive lens that minimizes thermal variations in lens back focal length thereby maintaining a focal plane for optically coupled optical fibers as the temperature varies.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
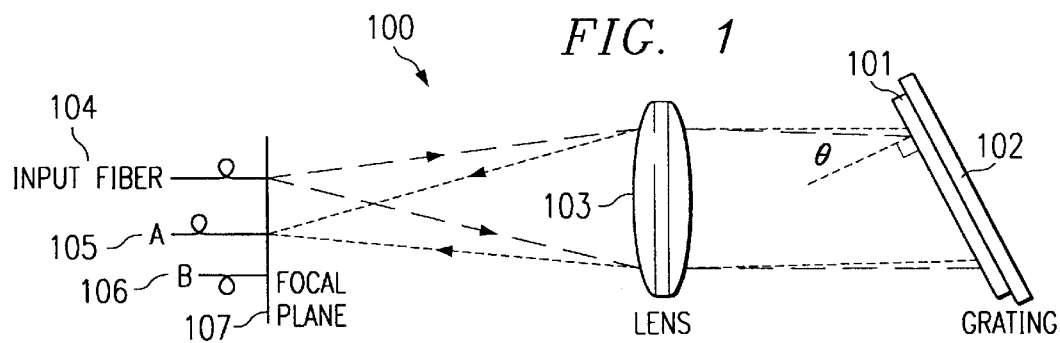
FIG. 1 illustrates one embodiment of a thermally compensated optical system according to teachings of the present invention.

Preferred embodiments and their advantages are best understood by reference to FIGS. 1 through 4, wherein like numbers are used to indicate like and corresponding parts. The conceptual groundwork for the present invention involves optimizing thermal characteristics of optical devices for varying thermal conditions. In one form, coefficients of expansion for optical supports are matched to optical components within an optical system. Coefficients of expansion for lens materials, including deviations in indices of refraction for those lens materials, are matched to optical mount materials for supporting optical components. Through matching lens materials with supporting mount materials, the thermal response of the optical device can be optimized thereby providing a relatively wide operating range for varying thermal conditions.

In one embodiment, operating characteristics for a wavelength division demultiplexer and multiplexer (WDDM) are improved over a wide temperature range through providing an operating condition for the WDDM that is temperature-independent. WDDMs are used in optical communication networks and may be configured as a wave length division demultiplexer (WDD) or a wave length division multiplexer (WDM) for demultiplexing or multiplexing optical signals. A wavelength division demultiplexer (WDD) demultiplexes optical signals by separating polychromatic signals into a series of nearly monochromatic signals within narrow-bandwidth channels. Each channel includes a center wavelength derived from the original optical signal upon becoming incident on a diffraction grating operable to separate the signal into its constituent wavelengths. In this manner, multiple signals may be communicated from one optical fiber to multiple optical fibers.

In a similar manner, WDDMs may be configured as wavelength division multiplexers(WDM) for multiplexing optical signals. As a WDM, several optical signals having respective wavelengths are composed into one optical signal. For example, a WDM may include several input fibers and associated optical signals which may be incident to a diffraction grating. Each signal may be combined into a composite signal (e.g. multiplexed) and communicated via a single optical fiber. As such, "WDDM" is referenced in a general sense to describe a thermally compensated optical device or system.

In one embodiment, lens material for the WDDM is matched to optical support materials having substantially similar temperature coefficients. A diffraction grating is optically coupled to the lens material and includes a material having a substantially zero temperature coefficient. Additionally, the lens material and the grating are mounted to optical supports made of materials having substantially similar temperature coefficients. The WDDM also includes a fiber mount coupled to the optical supports and positioned such that insertion loss of an optical fiber is minimized. The fiber mount and the lens mount include materials having substantially similar temperature coefficients such that an isothermal condition for a WDDM may be maintained during use.

Performance parameters for the WDDM, including channel bandpass, channel central wavelengths, polarization-dependent loss (PDL) and channel insertion loss are optimized and kept nearly constant as temperature varies. For example, an operating temperature range for a WDDM may be −5° C. to 60° C., and desirable operating characteristics for one embodiment may include temperature variations of ⅓ the range of a performance parameter. Performance parameters for an 8-channel WDDM operating at 1.55 $\mu$m wavelength may include:

Nominal channel frequency spacing: 200 GHz Channel center frequencies: 192.1, 192.3, . . . , 193.5 THz Center frequency tolerance (each channel): ±12.5 GHz Channel bandwidth at the −3 dB points: 67 to 104 GHz (83 typical)

Insertion loss: −2.8 dB typical, −3.5 dB minimum Adjacent-channel isolation within the 0.5 dB passband: −30 dB maximum, −35 dB typical PDL: 0.2 dB maximum In one embodiment, a thermal tolerance of either ⅓ of the basic tolerance or ⅓ of the difference between the typical and maximum values may be used. Using ⅓ of the difference between the typical and minimum values, thermal tolerances for the parameters above include:

Channel center frequency change: 4.2 GHz

Channel bandwidth change: ±7 GHz

Insertion loss change: ±0.23 dB

Isolation change: ±1.7 dB

PDL change: ±0.07 dB

The thermal tolerances for the WDDM are for the temperature range mentioned above and provide performance deviations from 20° C. As such, optical devices, lenses, supporting materials, etc. may be compensated using the tolerances above to provide a thermooptically compensated optical device operable as a WDDM.

FIG. 1 illustrates one embodiment of a thermally compensated optical system according to teachings of the present invention. The system may use the design tolerances and methodology described above, or other tolerances that may be used by the optical system illustrated in FIG. 1. A thermally compensated optical system, illustrated generally at 100, includes a diffraction grating 102 coupled to a grating mount 101 which may be positioned within an optical path. A lens assembly 103 is optically coupled to diffraction grating 101 and collimates light incident on lens assembly 103 and communicated to diffraction grating 101. System 100 further includes an input fiber 104 optically coupled to lens assembly 103 for providing an optical signal. A first output fiber 105 and a second output fiber 106 may receive optical signals provided by diffraction grating 101 via lens assembly 103. Input fiber 104, first output fiber 105 and second output fiber 106 are optically coupled to focal plane 107 having a focus depth associated with the optical components of system 100.

In one embodiment, lens assembly 103 includes a lens mount (not expressly shown) made of a material having substantially the same temperature coefficient as grating mount 102. Additionally, a fiber mount (not expressly shown) coupling the optical fibers may also include a material having substantially the same temperature coefficient as the lens mount. As such, variations in temperature will cause substantially equal expansion and contraction of each mount thereby maintaining optical signal integrity and associated optical focal planes associated with lens assembly 103 thereby minimizing insertion loss of the optical fibers at focal plane 107.

During use, lens assembly 103 collimates light from input fiber 104 and communicates it to grating 101. Grating 101 separates the light into separate optical signals or channels having constituent wavelengths and sends an angularly dispersed spectrum to lens assembly 103. Lens assembly 103 focuses a respective linearly dispersed spectrum onto focal plane 107, and first and second output fibers 105 and 106 each receive a different portion of the spectrum (i.e. a separate channel). Typically, the spectral range is less than 5% of the central wavelength so that the wavelength is, to a first approximation, substantially constant.

In one embodiment, system 100 may be thermooptically compensated through determining a thermooptical response of diffraction grating 101. Using collimated light, the angle of incidence $\alpha$, the vacuum wavelength $\lambda$, the angle of diffraction $\beta$, the diffraction order m and the index of refraction n of the medium through which the light travels just prior to diffraction at grating 101 are related by a two-dimensional grating equation:

$$\sin\alpha - \sin\beta = \frac{m\lambda}{nd}; m = 0, \pm 1, \pm 2, \pm 3 \ldots \quad (1)$$

In the present case, the grating's incidence medium is air, for which n differs from unity by $2.7 \times 10^{-4}$, enabling n=1. Equation (1) becomes $$\sin\alpha - \sin\beta = \frac{m\lambda}{d}; m = 0, \pm 1, \pm 2, \pm 3 \ldots \quad (2)$$

Given a linear coefficient of expansion, $\gamma$, $$L = L_0[1 + \gamma(T - T_0)] \quad (3)$$

where L is the length of a part at temperature T, and $L_0$ is the length at temperature $T_0$. As the temperature T changes, and assuming that all other parts do not expand, $\beta$ and $\alpha$ are constant. Holding $\beta$ constant, a formula for the corresponding wavelength can be provided as the wavelength for a certain output fiber, such as second output fiber 106. At temperature T, Equation 2 holds, while at the nominal temperature $T_0$ produces the equation $$\sin\alpha_0 - \sin\beta_0 = \frac{m\lambda_0}{d_0} \quad (4)$$

Here and in what follows the subscript "0" refers to values at temperature $T_0$.

Since $\alpha$ and $\beta$ are invariant with temperature, using equations (2) and (4):

$$\frac{\lambda_0}{d_0} = \frac{\lambda}{d} \quad (5)$$

Let $\Delta T = T - T_0$ and $\Delta\lambda = \lambda - \lambda_0$. By the definition of $\gamma$, $$d = d_0(1 + \gamma\Delta T) \quad (6)$$

Using equations (5) and (6), $$\Delta\lambda = \lambda_0 \frac{d}{d_0} - \lambda_0 = \lambda_0(1 + \gamma\Delta T) - \lambda_0 \quad (7)$$

Resulting in:

$$\Delta\lambda = \lambda_0 \gamma \Delta T \quad (8)$$

Equation (8) illustrates that a change in wavelength ($\Delta\lambda$) at an output fiber is proportional to the original wavelength ($\lambda_0$), the coefficient of expansion of the grating ($\gamma$), and the change in temperature ($\Delta T$) As such, minimizing the coefficient of expansion of diffraction grating 101 results in system 100 having reduced signal loss due to temperature variations.

In one embodiment, grating 101 may include a replica grating that includes BK7 glass as the grating substrate material and a thin layer of epoxy formed as a surface-relief features of grating 101. A thin layer of metal may also be coated over the epoxy to give grating 101 reflective properties. Substituting values into Equation (8) above for the BK7 grating 101 design, $\lambda$=1555 nm, $T_0$=20° C., T=60° C., and $\gamma$=7.1×10$^{-6}$/K for BK7 glass. From equation (8):

$$\Delta\lambda = 0.44 \text{ nm} \quad (9)$$

As such, the center wavelengths of all channels will shift with temperature by an amount $\Delta\lambda$ that is nearly the same for all channels, due to the spectral range being small compared to the mean wavelength. In one embodiment system 100, having channel bandwidths that are of the order of 0.0071 times the wavelength (e.g. a coarse WDDM), may employ an optical glass (e.g. BK7) for the grating substrate material. However, for narrower bandwidths, thermal shifts of glass gratings may become very significant, desiring use of low-expansion grating materials for grating 101 and/or compensation for thermally induced changes in the grating period.

Lens assembly 103 may be thermooptically matched to diffraction grating 101 and focal plane 107 based on variations of the materials of each element within lens assembly 103 in response to changes in temperature. One method for thermooptically compensating lens assembly 103 includes determining a lens material having an optimized coefficient of thermal expansion and temperature derivative of refractive index. A lens design for lens assembly 103 includes analyzing the thermal performance of the lens assembly as it relates to its focus relative to focal plane 107 as a function of temperature.

As such, in one embodiment system 100 includes diffraction grating 101 having a substantially zero temperature coefficient and coupled to grating mount 102 having a temperature coefficient. Lens assembly 103 is optically coupled to diffraction grating 101 and communicates optical signals between the lens assembly 103 and the diffraction grating 101. For example, lens assembly 103 collimates the light communicated by input fiber 104 and communicates the light to diffraction grating 101. Diffraction grating 101 separates the incident light into several optical signals and returns each optical signal having its own frequency to first and second output fibers 105 and 106 through lens assembly 103. Lens assembly 103 and grating mount 102 are thermooptically compensated to minimize signal loss of the optical signal in response to a temperature variation. As temperature varies, diffraction grating 101 having a substantially zero temperature coefficient minimizes signal loss which may include variations in output signal frequencies caused by expansion of grating materials.

Figure 2:
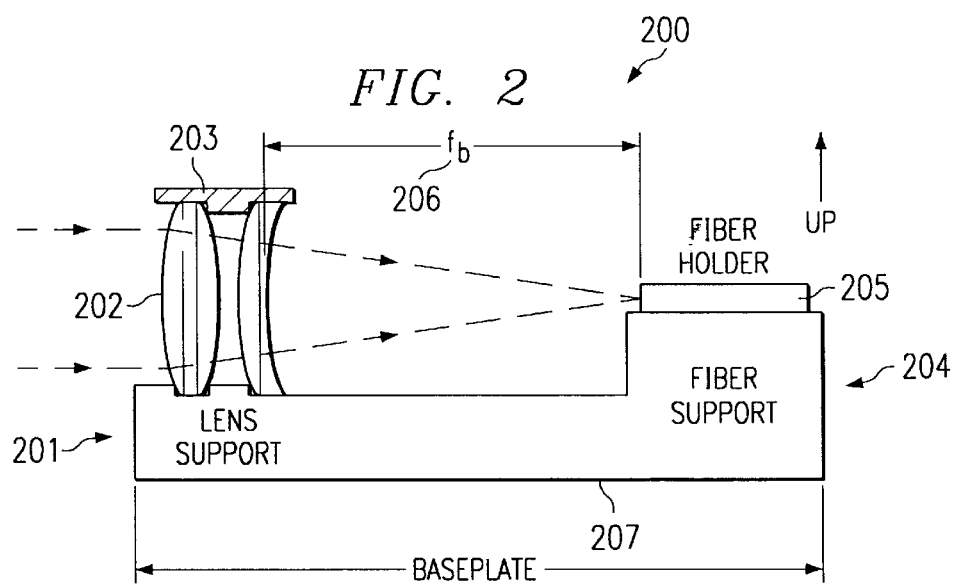
FIG. 2 illustrates one embodiment of a thermally as compensated optical device according to teachings of the present invention.

FIG. 2 illustrates one embodiment of a thermally compensated optical device according to teachings of the present invention. A thermally compensated optical device, shown generally at 200, includes a lens mount 201 supporting a lens assembly 202 which may include several lenses coupled using coupling element 203. Device 200 further includes a fiber mount 204 supporting a fiber mount plate 205 for holding or positioning optical fibers relative to lens assembly 202. Lens mount 201 and fiber support 204 are coupled via baseplate 207. Lens assembly 202 is positioned at a back focal length 206 referenced as $f_b$ such that a focal plane for optical fibers mounted on fiber mount plate 205 may be maintained.

In one embodiment lens mount 201, fiber mount 204, and baseplate 207 are made of materials having substantially similar temperature coefficients. Additionally, lens assembly 202 includes coupling elements 203 made of a material having substantially similar temperature coefficients as lens mount 201 and fiber mount 204. Lens assembly 202 may include a lens material that is matched to the thermal response of the materials used in each mount. A desired lens material may be determined for specified mount materials over a specified operating range. As such, as temperature varies, thermal expansion and contraction of the mount materials, including coupling element 203, will be substantially similar thereby reducing multi-axis deviations of optical elements coupled to each optical mount.

In one embodiment, changes in back focal length $f_b$ 206 due to a change in temperature ΔT must be equal and opposite to the change in length $\Delta z_m$ of the portion of baseplate 207 that lies between lens mount 201 and fiber mount 204. That is, $$\Delta f_b = -\Delta z_m \tag{10}$$

Thermal changes in refractive index and expansion of each lens element of lens assembly 202, thermal expansion of coupling elements 203 between the lens elements, thermal expansion of the baseplate 207, and thermal expansion of the period of the grating (not expressly shown) must be considered for thermooptic compensation to occur.

Due to optical glasses having wide variations in the first derivative of refractive index with respect to temperature, a glass or glasses for lens assembly 202 to satisfy Equation (10) for a chosen baseplate 207 material allows for selection of a lens material for lens assembly 202 to be aberration corrected over a temperature range. As such, lens assembly 202 may be fully optimized to have athermal performance, when considering the effect of expansion of coupling element 203 and lens mount 201.

For example, lens assembly 202 may include a 0.275 NA for a relatively small fiber spacing, 150 μm. With a multi-element lens made entirely from type F7 glass or one made with types LF5 and F4 intermixed, in conjunction with type 416 stainless steel for lens mount 201, coupling element 203, fiber mount 204 and base 207, optical performance may be diffraction-limited at most wavelengths and invariant with temperature. In such an embodiment, insertion loss is minimized when temperature changes, provided the optical fibers are mounted in such a way that the fiber ends remain above the same point. For example, an optical fiber may be clamped at the end nearest lens assembly 202 allowing the other end to change its position with temperature. Other means of fixing the optical fibers may also be used. As such, device 200 may be configured as an eight-channel WDDM with 150 μm fiber spacing and may experience small changes in effective focal length at different temperatures. The lens is optimized so that these changes result in negligible changes in wavelength at the optical fibers.

In another embodiment, fiber mount plate 205 may include plural positions for mounting plural optical fibers. Fiber mount plate 205 may be configured as a v-groove plate (not expressly shown) having plural v-grooves for mounting plural optical fibers. The v-groove plate may be coupled to fiber mount 204 using an adhesion layer positioned between fiber mount plate 205 and the fiber mount 205. The adhesion layer (not expressly shown) may include a coefficient of expansion and thickness such that a focal plane for each optical fiber coupled to fiber mount plate 205 is maintained as temperature varies.

Given the expansion of an adhesive material and a tolerance for maintaining the optical fibers within an optical plane for minimizing insertion loss of an optical fiber, the thickness of the adhesion material may be limited. For example, thickness of no more than one hundred microns may be required for minimizing signal loss. As such, an adhesion material having a specified temperature coefficient may be selected based on this tolerance. Additionally, a specified thickness of the adhesive material will maintain the optical fibers at an optimal operating position.

Figure 3:
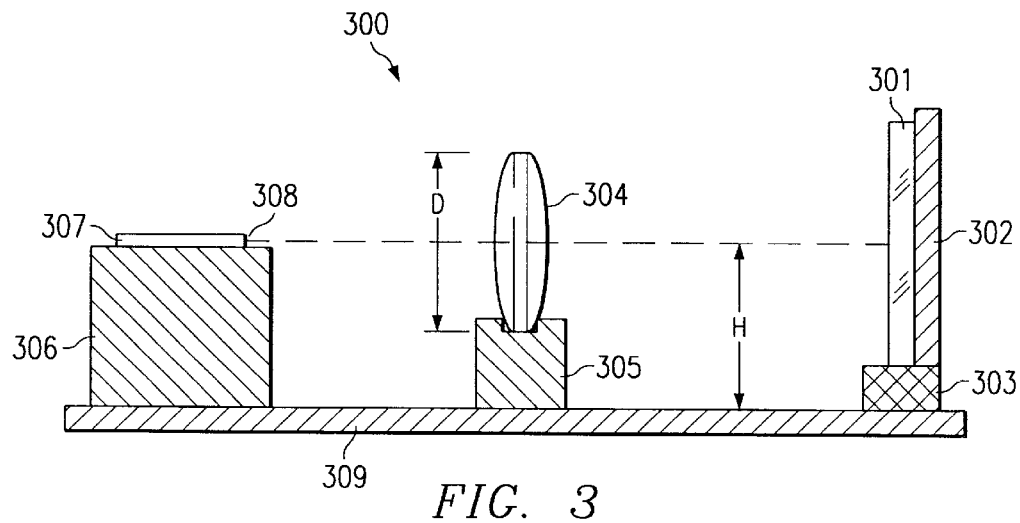
FIG. 3 illustrates one embodiment of a thermally compensated optical system mounted on a base according to teachings of the present invention.

FIG. 3 illustrates one embodiment of a thermally compensated optical system mounted on a base according to teachings of the present invention. A thermally compensated optical system, illustrated generally at 300, may be operable as a wavelength division demultiplexer (WDD) or wavelength division multiplexer (WDM) and includes a diffraction grating 301 coupled to a grating mount 302. Diffraction grating 301 is optically coupled to optical fiber 308 via lens assembly 304. Optical fiber 308 is coupled to a fiber mount 306 and includes a material having a temperature coefficient. Lens assembly 304 is positioned between optical fiber 308 and diffraction grating 301 using lens mount 305 and base 309 and made of materials having substantially similar temperature coefficients. Diffraction grating 301 is made of a material having a substantially zero temperature coefficient such that optical signal integrity may be maintained as temperature varies. Grating mount 302 is coupled to grating mount base 303 and maintains diffraction grating 301 at an optimized position relative to lens assembly 304.

In one embodiment, lens mount 305, fiber mount 306, base 309 and grating mount 302 include materials having temperature coefficients that are substantially similar. Each mount is coupled to a base 309 and positioned such that each optical component is maintained as temperature varies. Additionally, lens assembly 304 has a diameter such that a variation in the vertical axis of lens assembly 304 due to a change in temperature does not affect communication of optical signals between diffraction grating 301, lens assembly 304, and optical fiber 308. FIG. 3 illustrates lens mount 305 in contact with the lower part of lens assembly 304. However, other embodiments may include coupling an upper portion of lens assembly 304, circumferentially coupling lens assembly 304, or other combinations for coupling the optical element of lens assembly 304.

In one embodiment, fiber mount plate 307 includes a clamping element (not expressly shown) operable to hold optical fiber 308 at the same position on fiber mount 306 as temperature varies. For example, as temperature varies, fiber mount 306 and lens mount 305 may expand in a vertical direction thereby altering the focal point of an optical signal. As such, optical fiber 308 using a clamping element is maintained within a focal plane for communicating optical signals.

In one embodiment, base 309, fiber mount 306, lens mount 305, grating mount 302, and grating mount base 303 are made of materials having substantially similar temperature coefficients. For example, each optical mount may be made of stainless steel, such as "416" stainless steel having a temperature coefficient of $9.9 \times 10^{-6}$ per C. As such, a coaxial optical relation for communicating optical signals can be maintained as temperature varies.

For example, the vertical direction illustrated in FIG. 3 includes an x-z plane. Diffraction grating 301 having substantially minimized optical power in the vertical (x) direction results in its vertical expansion having minimal effect. Each optical mount made of materials having the same coefficient of expansion may result in a linear coefficient of expansion $\alpha_m$. Additionally, fiber mount plate 307 may include a v-groove plate, operable to hold fibers 308 and a thin layer of adhesive (not expressly shown) that holds fiber mount plate 307 to fiber mount 306. For example, the v-groove plate may include silicon, which has a coefficient of expansion of $2.33 \times 10^{-6}$ per ° C. Given a typical operating temperature range of −5 to +60° C. and an overall 1.64−mm dimension, using equation (6) for the temperature change results in a dimension equal to $$[1+2.33\times 10^{-6}(60-20)][1.64]=1.64015 \text{ mm}$$

as temperature is increased from 20° C. to 60° C. Thus, the change in fiber location is minimal at 0.15 μm, which is negligible compared to 62.5 μm, the diameter of a typical optical fiber. As such, system 300 may neglect the thickness of v-groove. Additionally, maintaining an adhesive thickness of 0.5 mm or less may provide a negligible effect, since adhesives typically have expansion coefficients $\sim 50 \times 10^{-6}$ per degree C.

The x-z plane of system 300 may be maintained by determining the interaction of elements within system 300 as temperature varies. System 300 may be initially aligned at room temperature $T_0$, with fiber 308 and the center of lens assembly 304 maintained at a height H above baseplate 309. At a new temperature, $T_1$, the fiber height H is $$x_F = H(1+\alpha_M \Delta T) \tag{11}$$

where $\Delta T = T_1 - T_0$. At temperature $T_1$, the center of lens assembly 304 is at a height of $$x_L = (H-\tfrac{1}{2}D)(1+\alpha_M \Delta T)+\tfrac{1}{2}D(1+\alpha_L \Delta T) \tag{12}$$

where $\alpha_L$ is the coefficient of expansion of the lens element within lens assembly 304 and D is the diameter of lens assembly 304. At this temperature, the fiber height H may exceed lens assembly's 304 center height by a distance $$\Delta x = (H-\tfrac{1}{2}D)(1+\alpha_M \Delta T)+\tfrac{1}{2}D(1+\alpha_L 66\ T)-H(1+\alpha_M \Delta T) \tag{13}$$

Resulting in $$\Delta x = \tfrac{1}{2}D\Delta T(\alpha_L - \alpha_M). \tag{14}$$

Given a lateral magnification of system 300 equal to −1, the image of fiber 308 may also move by a distance $-\Delta x$ relative to the center of lens assembly 304. Thus, the image of fiber 308 has moved away from the fibers themselves by a distance $-2\Delta x$, and the vertical distance between the image and fiber 308 is $$-2\Delta x = -D\Delta T(\alpha_L - \alpha_M). \tag{15}$$

Letting $x_I$ be the distance of the image from the baseplate, (15) becomes $$x_I - x_F = -D\Delta T(\alpha_L - \alpha_M) \tag{16}$$

The quantity $x_I x_F$ is the image shift at fiber 308. As such, equations (15) and (16) provide the distance between the image of the fiber 308 and the fibers themselves in terms of the lens diameter, the temperature change, and the coefficients of expansion of the lens and of the supports. Providing system 300 with supports and focusing optics having substantially equal coefficients of expansion results in minimal image shift in the vertical direction leading to optimized performance of system 300 as temperature changes.

In one embodiment, the thermal response of fiber mount plate 307, having plural fibers, may include a wave length change of $\Delta \lambda_{fm,n}$ by which the nth fiber moves away from the optical axis when the temperature deviates from room temperature, $T_0$, to the maximum operating temperature, $T_1$. This parameter originates from thermal expansion of fiber mount 306 having subscript "fm."

Given the linear dispersion of system 300 is $$\frac{\partial \lambda}{\partial y}$$

at wavelength λ, the change in wavelength $\Delta \lambda_{fm,n}$ due to fiber mount expansion is $$\Delta \lambda_{fm,n} = \Delta y_{fm,n} \frac{\partial \lambda}{\partial y}. \tag{17}$$

The linear expansion of a material as a function of temperature is $$L_1 = L_0[1+\alpha(T_1-T_0)]. \tag{18}$$

where $L_0$ is the length of the material at temperature $T_0$, $L_1$, is the length of the material at temperature $T_1$, and α is the coefficient of linear expansion of the material. Combining Eqns. (17) and (18), the change in wavelength due to expansion of the fiber mount may be determined for a specific fiber mount material.

Each WDDM device may include a fiber mount plate made of a specific material and having a coefficient of expansion. For example, an eight-channel dense multi-mode WDDM may include a fiber mount plate made of silicon, which has a coefficient of expansion of $2.33 \times 10^{-6}$ per degree centigrade. Assuming that room temperature is 20° C., the specification for the eight-channel WDDM illustrates the greatest deviation from room temperature occurs at the maximum operating temperature, which is 60° C. Thus at $T_0$ 20 °C. and $T_1 = 60°$ C., Equation (18) results in $L_1 = 0.9000839$ mm and $\Delta y_{fm,end} = L_1 - L_0 = +8.39 \times 10^{-5}$ mm. Using this value in (17), results in $$\Delta\lambda_{fm,end} = (8.39 \times 10^{-5} \text{ mm})(0.00649 \text{ nm}/\mu m)(1000 \text{ }\mu m/mm)$$

$$\Delta\lambda_{fm,end} = +0.000544 \text{ nm (for a SILICON FIBER MOUNT)}$$

In another embodiment, a plastic fiber mount such as "LCP" may be used as fiber mount plate 307. LCP is strongly anisotropic and has an expansion coefficient of approximately zero in one orientation and $45 \times 10^{-6}$ per ° C. in an orientation orthogonal to the first direction. Assuming a worst-case condition, $$\Delta\lambda_{fm,end} = +0.0105 \text{ nm (PLASTIC FIBER MOUNT)}.$$

As such, an eight-channel and four channel WDDM device with channel spacing of 250 μm or less may use a fiber mount plate made from high-expansion material such as plastic resulting in small changes in channel wavelength due to lateral expansion of the fiber mount. Other embodiments may include metals, ceramics, silicon, etc.

Figure 4:
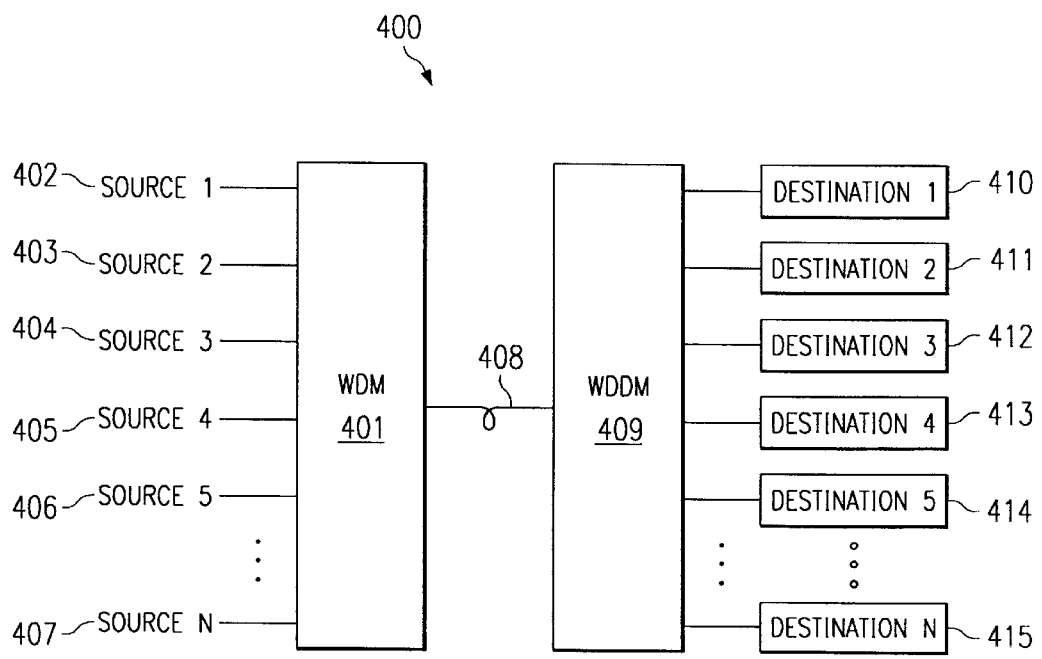
FIG. 4 illustrates a communication network operable to communicate signals using a thermally compensated optical device according to teachings of the present invention.

FIG. 4 illustrates one embodiment of a communication network employing thermally compensated optical devices according to teachings of the invention. The network, illustrated generally at 400, includes a WDM operable to multiplex signals from first source 402, second source 403, third source 404, fourth source 405, fifth source 406 and nth source 407. Optical signals may be multiplexed and communicated via optical fiber 408 to WDD 409 operable to demultiplex the optical signal. Upon WDD 409 demultiplexing the optical signal, each demultiplexed signal may be communicated to a respective destination such as first destination 410, second destination 411, third destination 412, fourth destination 413, fifth destination 414, and nth destination 415.

Network 400 may be realized in part or in whole, as several types of communication networks that may include wide area networks, interstate or regional networks, local area networks or other networks operable to use thermally compensated optical devices. As such, WDM 401 and WDD 409 may be used in environments which may vary in temperature thereby not requiring a constant temperature for communicating optical signals. Therefore, optical signals may be communicated within a network without having to use controlled environments, thermoelectric devices, etc., for multiplexing and demultiplexing optical signals.

Although the disclosed embodiments have been described in detail, it should be understood that various changes, substitutions and alterations can be made to the embodiments without departing from their spirit and scope.

What is claimed is:

1. A thermally compensated optical device comprising:
   a diffraction grating including a substantially zero temperature coefficient;
   a grating mount coupled to the diffraction grating, the grating mount including a temperature coefficient;
   a lens assembly coupled to a lens mount having a temperature coefficient, the lens assembly operable to communicate optical signals between the lens assembly and the diffraction grating; and
   wherein the lens assembly includes a lens element with a refractive index and a thermal derivative thereof based on the temperature coefficient of the lens mount and a baseplate.

2. The device of claim 1, further comprising plural lens elements coupled using plural coupling elements, the plural coupling elements including one or more temperature coefficients.

3. The device of claim 1, further comprising a fiber mount coupled to the lens assembly, the fiber mount including substantially the same temperature coefficient as the grating mount.

4. The device of claim 3, wherein the fiber mount and the lens assembly are thermooptically compensated to minimize insertion loss of the optical device.

5. The device of claim 1, wherein the lens assembly operable to collimate the optical signal communicated between the optical grating and the lens assembly.

6. The device of claim 5, wherein the lens assembly includes an aperture sized to reduce signal loss of the collimated optical signal in response to a variation in temperature.

7. The device of claim 1, wherein the lens assembly comprises:
   a plurality of lenses coupled using coupling elements having one or more temperature coefficients; and
   wherein the plurality of lenses include expansion coefficients, refractive indices and thermal derivatives thereof based on the temperature coefficients of the lens mount, the coupling elements and the baseplate.

8. The device of claim 1, further comprising a wavelength division demultiplexer.

9. The device of claim 1, further comprising a wavelength division multiplexer.

10. The device of claim 1, wherein the grating mount comprises stainless steel.

11. The device of claim 1, further comprising the base plate including a base plate temperature coefficient.

12. The device of claim 11, wherein the base plate temperature coefficient substantially the same temperature coefficient as the lens mount.

13. The device of claim 1, wherein the lens assembly comprises a lens mount including substantially the same temperature coefficient as the grating mount.

14. A thermally compensated optical system comprising:
   a lens mount operable to position a lens assembly within an optical path, the lens mount having a temperature coefficient;
   an optical fiber mount operable to position an optical fiber at a distance relative to the lens assembly, the optical fiber mount including a substantially similar temperature coefficient as the lens mount; and
   the fiber mount positioned relative to the optical lens mount such that the focal plane of the lens assembly is maintained at the optical fibers in response to a temperature variation.

15. The system of claim 14, wherein the fiber mount further comprises a fiber mount plate including plural positions operable to mount plural optical fibers.

16. The system of claim 15, wherein the fiber mount plate comprises a v-groove plate including plural v-grooves operable to mount the plural fibers.

17. The system of claim 15, further comprising an adhesion layer between the fiber mount plate and the fiber mount, the adhesion layer including a coefficient of expansion and thickness such that the fiber optic focal plane is maintained in response to the temperature variation.

18. The system of claim 14, further comprising an optical fiber clamping element operable to substantially hold the fiber optic at a position relative to the lens assembly.

19. The system of claim 18, further comprising an optical grating optically coupled to the lens assembly, the optical grating having a substantially zero temperature coefficient.

20. The system of claim 14, wherein the optical mount, the grating mount, and the lens mount comprise stainless steel.

21. The system of claim 18, further comprising a wavelength division demultiplexer.

22. The system of claim 18, further comprising a wavelength division multiplexer.

23. A thermally compensated optical system comprising:
a diffraction grating coupled to a grating mount including a temperature coefficient;
an optical fiber coupled to a fiber mount, the fiber mount including a fiber mount temperature coefficient; and
a lens assembly coupled to a lens mount, the lens mount including a substantially similar temperature coefficient to the fiber mount, the lens assembly positioned between the optical fiber mount and the grating mount.

24. The system of claim 23, wherein the lens assembly comprises plural lenses and coupling elements between the lenses, and the coupling elements include one or more temperature coefficients.

25. The system of claim 23, wherein the diffraction grating comprises a substantially zero temperature coefficient.

26. The system of claim 23, wherein the fiber mount comprises plural positions operable to couple plural optical fibers.

27. The system of claim 26, wherein the plural fibers are maintained in a substantially similar vertical position relative to the lens assembly in response to a temperature variation.

28. The system of claim 23, further comprising a communication network operable to communicate optical signals between an initiating point and a destination point.

29. The system of claim 23, further comprising a wavelength division demultiplexer.

30. The system of claim 23, further comprising a wavelength division multiplexer.

31. An optical network for communicating information embodied within an optical signal comprising:
an optical fiber operable to communicate information;
a thermally compensated optical device operable to communicate information between an initiating point and a destination point, the device comprising:
a lens mount operable to position a lens assembly within an optical path, the lens mount including a temperature coefficient;
a fiber mount operable to position an optical fiber at a thermally compensated distance relative to the lens assembly, the optical fiber mount including a substantially similar temperature coefficient as the lens mount; and
the fiber mount positioned relative to the optical lens mount such that a focal plane associated with the optical fiber is maintained in response to a temperature variation.

32. The device of claim 31, further comprising plural lens elements coupled using plural coupling elements, the plural coupling elements including one or more temperature coefficients.

33. The network of claim 31, wherein the diffraction grating comprises a substantially zero temperature coefficient.

34. The network of claim 31, further comprising a wavelength division demultiplexer.

35. The network of claim 31, further comprising a wavelength division multiplexer.

36. A method of fabricating a thermally compensated optical device comprising:
coupling a diffraction grating to a grating mount, the diffraction grating including a substantially zero temperature coefficient;
coupling a fiber mount plate to a fiber mount, the fiber mount plate including a fiber mount temperature coefficient;
positioning a lens assembly between the grating mount and the fiber mount, the lens assembly operable to communicate optical signals between the lens assembly and the diffraction grating; and
coupling a lens element to the lens assembly, the lens element including an expansion coefficient, a refractive index and thermal derivatives of the refractive index based on the temperature coefficient of the baseplate.

37. The method of claim 36, further comprising:
coupling an optical fiber to the fiber mount plate; and
providing an adhesive layer including an adhesive temperature coefficient between the fiber mount and the fiber mount plate, the adhesive layer including a thickness based on the adhesive temperature coefficient.

38. The method of claim 36, further comprising:
providing multiple lens elements; and
coupling the elements using coupling elements including one or more temperature coefficients.

39. The method of claim 36, further comprising positioning the lens assembly to maintain a back focal length in response to temperature variations.

40. The method of claim 36, further comprising coupling the grating mount and fiber mount to a base plate, wherein the baseplate includes a temperature coefficient substantially similar to the fiber mount.

* * * * *